United States Patent Office 3,592,731
Patented July 13, 1971

3,592,731
PHOTOGRAPHIC PAPER COMPRISING A CATIONIC AMINO ALDEHYDE RESIN AND A CATIONIC POLYAMIDE-EPICHLOROHYDRIN RESIN AND AN ANIONIC POLYACRYLAMIDE DRY STRENGTH RESIN AND METHOD FOR ITS MANUFACTURE
William H. Griggs, Rochester, N.Y., assignor to Eastman Kodak Company, Rochester, N.Y.
No Drawing. Filed Oct. 24, 1968, Ser. No. 770,427
Int. Cl. D21h 3/48; G03c 1/86
U.S. Cl. 162—164         18 Claims

ABSTRACT OF THE DISCLOSURE

A photographic paper base comprising a cationic thermosetting amino-aldehyde wet-strength resin, a cationic thermosetting polyamide - epichlorohydrin wet - strength resin, and an anionic polyacrylamide dry-strength resin. This combination of three different resins gives adequate strength properties while providing an aldehyde concentration which is great enough to provide the desired hardening of photographic emulsion applied to the paper base yet not so great as to adversely affect its sensitometric properties.

---

This invention relates in general to the manufacture of paper. More particularly, this invention relates to an improved paper, containing a mixture of wet- and dry-strength resins, which is especially useful in the photographic art and to a method for its production.

In order to prevent disintegration during coating and processing, photographic paper base must have good wet strength. This is normally achieved by the addition of a wet-strength resin to the pulp slurry prior to forming on the paper machine. Among the resins which are most widely used for this purpose are the amino-aldehyde resins and especially the amino-formaldehyde resins. In addition to providing wet strength, these resins are advantageous in that they undergo a gradual hydrolysis in the paper and, as a result, release the aldehyde over a prolonged period which may be as great as two or three years. The aldehyde which is released is absorbed by the gelatin in the photographic emulsion and it acts as a gelatin-hardening agent. This hardening promotes good adhesion between the paper base and the emulsion layer so as to minimize frilling and, in addition, serves to reduce lint pick-up by the emulsion layer as a result of contact with drying mats during the drying step in the processing operation. However, if the amount of aldehyde taken up by the gelatin is too great, several serious problems may result. In particular, an excessive amount of aldehyde results in poor sensitometric stability and in the formation of mottle in the emulsion layer. It also leads to "colder" tones and poor tone stability with black and white emulsions and to poor magenta contrast stability with color emulsions. Unfortunately, however, when amino-aldehyde resins are utilized in a proportion sufficient to give adequate wet strength the amount of aldehyde released is such that the emulsion layer is adversely affected. Thus, it is not possible solely by use of amino-aldehyde resins to achieve the necessary wet strength yet at the same time provide an amount of aldehyde which is great enough to give adequate hardening of the emulsion layer yet not so great as to adversely affect the photographic properties of the emulsion.

It has now been discovered that the problem described hereinabove can be overcome and a photographic paper which has both adequate wet strength and the desired low content of aldehyde can be produced by incorporating a combination of three different resins in the pulp slurry prior to formation of the paper. The resins utilized in accordance with this invention are (1) a cationic thermosetting amino-aldehyde wet-stength resin, (2) a cationic thermosetting polyamide - epichlorohydrin wet-strength resin, and (3) an anionic polyacrylamide dry-strength resin.

All three of the resins employed in the practice of this invention are well known commercially available materials and each of them has been used heretofore in the paper-making art. However, use of these resins in this particular combination is novel and it was surprising to find that these resins could be successfully used together and that they would act to provide the particular characteristics which are especially desired in photographic papers. Each of the three resins is essential in achieving the desired result. Thus, the cationic thermosetting amino-aldehyde wet-strength resin serves to provide the desired gradual release of a small amount of aldehyde as well as to improve the wet strength of the paper. The cationic thermosetting polyamide - epichlorohydrin wet - strength resin contributes greatly to the wet strength and thereby permits the amino-aldehyde resin to be used at low levels where no more than the desired small amount of aldehyde, sufficient to provide adequate hardening, is released. Finally, the anionic polyacrylamide dry-strength resin serves to render feasible the use of the other two resins in combination, since, without this resin, adequate drainage during the web forming process will not be achieved and manufacture of the paper on a commercial basis would not be practical.

While applicant does not wish to be bound by any theoretical explanation for the manner in which his invention functions, it is believed that the anionic polyacrylamide dry-strength resin is absorbed onto the cellulose fibers and thereby renders them more retentive of the cationic wet-strength resins. The amino-aldehyde resin is an acid-curing resin intended for use at a pH of about 4 or less, whereas the polyamide-epichlorohydrin resin is a neutral- or alkaline-curing resin which is most efficient in the pH range of about 6 to about 10. The action of the anionic polyacrylamide resin in improving retention of the cationic resins permits operation within a pH range where the polyamide-epichlorohydrin resin is reasonably effective while still retaining sufficient amino-aldehyde resin to provide the desired level of aldehyde. It is thus an important feature of the method of this invention to regulate the pH within a relatively narrow range, as hereinafter described in detail. This pH range is above that at which amino-aldehyde wet-strength resins are ordinarily employed and below that at which polyamide-epichlorohydrin wet-strength resins are ordinarily employed.

The first class of resins utilized as a component of the resin system of this invention are the cationic thermosetting amino-aldehyde wet-strength resins. Included within this class of resins are (1) colloidal cationic aminotriazinealdehydes resins such as are disclosed in U.S. Pats. 2,345,543; 2,417,014 and 2,564,925, with the use thereof in paper making being described in U.S. Pats. 2,548,513; 2,559,220 and 2,559,221; (2) cationic urea modified melamine-formaldehyde resins such as are disclosed in U.S. Pats. 2,485,079 and 2,485,080; (3) cationic polyamine modified melamine-formaldehyde resins such as are disclosed in U.S. Pat. 2,769,800; and (4) cationic amine modified urea-formaldehyde resins. The exact composition of the amino-aldehyde resin is not critical for the purposes of this invention and it is, accordingly, intended to include within its scope all amino-aldehyde resins which are cationic and thermosetting in nature and which act as wet-strength agents for paper. It is, however, preferred to employ amino-formaldehyde resins and particularly preferred to employ the colloidal cationic melamine-formaldehyde resins including those described in the aforesaid patents as well as the high efficiency type resins which employ higher ratios of formaldehyde to melamine, such as are disclosed in U.S. Pat. 2,986,489.

The second class of resins utilized as a component of the resin system of this invention are the cationic thermosetting polyamide-epichlorohydrin wet-strength resins. Preparation of these resins is disclosed in U.S. Pat. 2,926,154 and their use as wet-strength agents in paper is described in U.S. Pat. 2,926,116. As taught in the aforesaid patents, these resins are produced by heating together, at a temperature of from about 110° C. to about 250° C., a $C_3$–$C_{10}$ saturated aliphatic dibasic carboxylic acid, such as adipic acid, and a polyalkylene polymine, such as diethylene triamine, in a mole ratio of polyalkylene polyamine to dibasic acid of from about 0.8 to 1 to about 1.4 to 1, to form a polyamide containing secondary amine groups and then reacting the polyamide with epichlorohydrin at a ratio of epichlorohydrin to secondary amine groups of about 0.5 to 1 to about 1.8 to 1. The resulting resin is substantive to cellulosic fibers and, therefore, can be added directly to the pulp stock to act as a wet strengthening agent.

The third class of resins utilized as a component of the resin system of this invention are the anionic polyacrylamide dry-strength resins. This class of resins is described in U.S. Pat. 3,332,834 for use in combination with alum and a non-thermosetting resin to produce a paper having high dry-strength but substantially no wet-strength. Other illustrations of use of resins of this class in the paper-making art are provided by U.S. Pats. 2,661,309 and 3,049,469. As taught in U.S. Pat. 3,332,834, the anionic polyacrylamide dry-strength resins are vinyl polymers which are at least 80 mole percent composed of —$CH_2CH(CONH_2)$— linkages, and preferably composed of —$CH_2CH(CONH_2)$— and

—$CH_2CH(COOH)$— linkages in molar ratio between 95:5 and 85:15, and are of a water-soluble or water-dispersible nature. Illustrative examples of such polymers are a copolymer of acrylamide and acrylic acid, a copolymer of acrylamide and methacrylic acid, an interpolymer of acrylamide, acrylic acid and acrylonitrile, an interpolymer of acrylamide, acrylic acid and ethyl acrylate, and the like. For the purposes of this invention, it is preferred to employ as the anionic polyacrylamide dry-strength resin a copolymer of acrylamide and acrylic acid and particularly preferred to employ a copolymer of from about 85 to about 95 mole percent acrylamide and from about 5 to about 15 mole percent acrylic acid.

It should be noted that the anionic polyacrylamide resins known to the art for use as dry-strength resins differ from the anionic polyacrylamide resins known to the art for use as filler retention aids in paper making. Resins of this latter class are described in U.S. Pats. 2,972,560 and 3,052,595 and it is apparent that they differ from the anionic polyacrylamide resins utilized as dry-strength agents in the fact that the retention aid resins are of much higher molecular weight. Because of their high molecular weight, resins of this class adversely affect sheet formation and for this reason are not suitable for the purposes of this invention. Although the lower molecular weight anionic polyacrylamide resins also serve to some extent as drainage and retention aids they function primarily as dry-strength agents and they have little effect on the formation and distribution of long fibers and, thus, do not adversely affect sheet formation. With reference to anionic polyacrylamide resins serving as dry-strength agents, see Reynolds, W. F., et al., "A Modified Acrylamide Polymer for Improving the Dry Strength of Paper," TAPPI, vol. 40, No. 10, 1957, and with reference to anionic polyacrylamide resins serving as retention aids see Woodberry, N. T., "A New Anionic Polyacrylamide Flocculant," TAPPI, vol. 44, No. 9, 1961. For additional information with respect to these two applications for polyacrylamide resins see also Linke, W. F., "Polyacrylamide as a Stock Additive," TAPPI, vol. 45, No. 4, 1962.

In manufacturing the improve paper of this invention, the resins described hereinabove are utilized in the following proportions:

(1) The cationic thermosetting amino-aldehyde wet-strength resin is used in an amount of from about 0.001 to about 0.006 part per part by weight of the cellulosic fibers on a dry basis, i.e., about 0.1 to about 0.6 percent by weight, and more preferably in an amount of from about 0.003 to about 0.005 part per part by weight, (2) The cationic thermosetting polyamide-epichlorohydrin wet-strength resin is used in an amount of from about 0.003 to about 0.01 part per part by weight of the cellulosic fibers on a dry basis, and more preferably in an amount of from about 0.005 to about 0.008 part per part by weight, and (3) The anionic polyacrylamide dry-strength resin is used in an amount of from about 0.004 to about 0.015 part per part by weight of the cellulosic fibers on a dry basis and more preferably in an amount of from about 0.007 to about 0.012 part per part by weight. In designating the proportions in which the resins are employed, the ranges specified are, in all instances, in terms of one hundred percent of the active agent.

The improved paper of this invention is comprised of cellulosic paper-making fibers and at least one member from each of the three classes of resins hereinbefore described. It can be made from any suitable pulp, such as sulfite, kraft or soda, cooked softwood, hardwood or groundwood, rag, rope, jute, and the like. Either bleached or unbleached pulp can be utilized, as desired. It can also be prepared from partially esterified cellulose fibers such as are described in U.S. Pats. 3,062,679 and 3,096,231.

While it is essential in the practice of this invention that the resin system include at least one resin from each of the three classes described, other additives commonly used in the paper-making art can also be utilized to advantage in preparing the improved paper of this invention and are employed in minor amounts in accordance with conventional practice. Thus, for example, it will ordinarily be desirable to include a water-soluble polyvalent metal salt, preferably aluminum sulfate or aluminum chloride, which aids in setting the anionic polyacrylamide dry-strength resin on the fibers. It will frequently also be desired to incorporate sizing agents in the furnish. Any of the known sizing agents for paper may be employed for this purpose, such as, for example, rosin size, modified rosin size, wax sizes, sizes based on ketene dimers, stearate size, and the like. It is preferred to employ sizes derived from stearic acid or related fatty acids, e.g. sodium stearate size, preparation of which is described, for example, in U.S. Pat. 3,096,231. As is well known in the art, when a sizing agent is used then it is necessary that the aluminum ion be present in the furnish. Yet another illustration of additives which can be advantageously incorporated in paper in conjunction with the resin system of this invention are water-soluble gums, such as the cellulose ethers, or the cationic starches. As is disclosed in U.S. Pat. 3,058,873, these additives serve to aid in attaining high wet strength.

The resins utilized in this invention can be incorporated in the furnish at any point prior to sheet formation, for example, in the beater, stock chest, Jordan engine, fan pump or head box, and are suitably added in the form of aqueous solutions or dispersions. It is, however, preferred that the resins be added after the pulp is refined as this gives maximum improvement in the physical properties of the paper.

For optimum results, the order in which the additives utilized are incorporated in the paper furnish should be carefully controlled. As a general rule, all of the anionic materials should be added before any of the cationic materials are added and, in particular, the anionic polyacrylamide dry-strength resin should be added before either of the cationic thermosetting wet-strength resins is added. Moreover, to achieve the desired results the pH should be regulated to attain a value in the range from about 4 to about 7 and preferably in the range from about 4.5 to about 5.5. The range for pH of from about 4 to about 7 is dictated by the fact that at a pH which is significantly below 4 the cationic thermosetting polyamide-epichlorohydrin wet-strength resin is ineffective, whereas at a pH of significantly above 7 release of the aldehyde by the cationic thermosetting amino-aldehyde wet-strength resin is retarded. While the cationic thermosetting amino-aldehyde wet-strength resin will not be an effective wet-strength agent at a pH value above about 4.5, and thus has little effect on wet strength within the pH range at which it is preferred to operate the method of this invention, this is not a significant detriment since adequate wet strength will be provided by the cationic thermosetting polyamide-epichlorohydrin wet-strength resin and the primary function of the cationic thermosetting amino-aldehyde wet-strength resin is to provide the desired slow release of aldehyde.

The optimum pH in a given situation will depend to some extent upon the nature of the additives which are used in addition to the wet- and dry-strength resins. For example, if sodium stearate size is employed the pH should not be significantly above 5.3 so that the desirable range in this instance would be from about 4.5 to about 5.3. Control of the pH may be effected by any suitable means, for example, by controlling the amount of the hereinbefore mentioned polyvalent metal salt, e.g. aluminum chloride, which is employed.

A preferred procedure in the practice of this invention is to first refine the pulp to the desired extent, then add the anionic polyacrylamide dry-strength resin, then the sizing agent, then the polyvalent metal salt in an amount sufficient to give the desired pH, then the cationic thermosetting amino-aldehyde and polyamide-epichlorohydrin wet-strength resins, and thereafter form and dry the paper sheet in the conventional manner. After drying, the thermosetting resins should be cured by heating the paper in accordance with conventional practice in the art. Suitable conditions for effecting curing are temperatures of from about 75° C. to about 130° C. and times of from about 1 to about 30 minutes.

The paper described herein may be utilized wherever paper having good wet and dry strength, good wet and dry stiffness, and high resistance to penetration of aqueous liquids is needed. It is especially useful, however, as a photographic paper for the reasons hereinbefore described and may be advantageously employed in this use with or without the use of coatings of polymeric film-forming resins such as the polyolefins.

The invention is further illustrated by the following examples of its practice in which all tests reported with respect to the physical characteristics of the paper were conducted in accordance with standard TAPPI test procedures, the identification numbers of which are as follows.

| Property: | TAPPI Test No. |
| --- | --- |
| Basic weight | T-410 |
| Thickness | T-411 |
| Elmendorf tear strength | T-414 |
| Mullen | T-403 |
| Wet tensile strength | T-456 |
| Taber stiffness | T-489 |
| Fold (MIT) | T-511 |

In these examples, the cationic thermosetting amino-aldehyde wet-strength resin utilized is identified as "Resin A" and is a melamine-formaldehyde resin which has been dissolved in dilute hydrochloric acid solution and aged to form the acid colloid. The cationic thermosetting polyamide-epichlorohydrin wet-strength resin is identified as "Resin B" and is a commercially available resin prepared from diethylene triamine, adipic acid and epichlorohydrin and marketed under the trademarks "Kymene 557" and "Kymene 709." The anionic polyacrylamide dry-strength resin is identified as "Resin C"; it is a copolymer consisting of about 90 weight percent acrylamide and about 10 weight percent acrylic acid and having a Brookfield viscosity in 10 percent aqueous solution, using a No. 4 spindle at 100 revolutions per minute, of 1250 ±750 centipoises, and it is marketed under the trademark "Accostrength 86." In all instances in the examples, the amounts of wet- or dry-strength resin or other additive are reported in weight percent of the additive based on bone dry fiber weight.

EXAMPLE 1

A 3000-lb. mixture of 60% softwood bleached sulfite fibers and 40% hardwood bleached sulfite fibers was dispersed in 6900 gallons of water containing 15 lbs. of carboxymethyl cellulose and refined through a double disc refiner and a Jordan. To one portion of the resulting pulp slurry there was added 0.3 percent of Resin A, 0.6 percent of Resin B, and 1.2 percent of Resin C, $AlCl_3$ in an amount sufficient to give a pH of 4.6, and 2% of sodium stearate sizing agent (prepared by reacting commercial stearic acid with double the stoichiometric proportion of sodium hydroxide), and then a paper sheet, designated herein as sheet 1–(a), was formed in the conventional manner on a paper machine, dried, tub sized with 4% gelatin, re-dried, and lightly calendered. To a second portion of the same pulp slurry there was added 1.2% of Resin A, $AlCl_3$ in an amount sufficient to give a pH of 4.1, 2% of sodium stearate sizing agent, and 3% of starch, and a second paper sheet, designated herein as sheet 1–(b), was formed in the same manner as sheet 1–(a). For purposes of comparison, the properties of sheets 1–(a) and 1–(b) are summarized in Table I.

TABLE I

| Property | Sheet 1—(a) | Sheet 1—(b) |
| --- | --- | --- |
| Basis weight (lbs./1,000 ft.²) | 48.0 | 48.75 |
| Thickness (mils) | 13.8 | 14.5 |
| Tear strength (Elmendorf), length direction | 140 | 136 |
| Tear strength (Elmendorf), cross direction | 180 | 172 |
| Mullen (p.s.i.) | 67 | 58 |
| Wet tensile strength (hectograms per 15 millimeter width) | 47 | 37 |

As shown by the above data, sheet 1–(a) exhibits improved strength as compared to sheet 1–(b). Moreover, when both of these sheets were coated with baryta (barium sulfate with gelatin binder) and then with a photographic emulsion the product prepared from sheet 1–(a) was superior to that from sheet 1–(b) as evidenced by improved contrast stability, reduced mottle, and improved image tone stability, resulting from the lower formaldehyde content.

Similar good results were obtained when the sodium stearate sizing agent was replaced with other sizes utilized in the paper-making art, e.g. a size consisting of a mixture of an alkyl ketene dimer dispersed with a cationic starch in water.

EXAMPLE 2

In a similar manner to that described in Example 1, sheets 2–(a) and 2–(b), corresponding to sheets 1–(a) and 1–(b) respectively, were prepared from the same furnish except that no carboxymethyl cellulose was used and the additives were incorporated in the pulp slurry before refining. The properties of sheets 2–(a) and 2–(b) are summarized in Table II.

TABLE II

| Property | Sheet 2–(a) | Sheet 2–(b) |
|---|---|---|
| Basic weight (lbs./1,000 ft.²) | 55.5 | 54.5 |
| Thickness (mils) | 11.0 | 11.5 |
| Tear strength (Elmendorf), length direction | 120 | 112 |
| Tear strength (Elmendorf), cross direction | 128 | 120 |
| Mullen (p.s.i.) | 42 | 42 |
| Wet tensile strength (hectograms per 15 millimeter width) | 36 | 34 |

Consideration of the above data indicates that sheet 2–(a) does not have as good physical properties as sheet 1–(a) and this is believed to be primarily a result of the fact that in this example the preferred procedure of adding the resins after refining was not followed. However, sheet 2–(a) is at least as good in physical properties as sheet 2–(b) and when both of these sheets were coated with baryta and then with a photographic emulsion, the product prepared from sheet 2–(a) was superior to that from sheet 2–(b) with respect to the photographic properties mentioned in Example 1 because of the lower content of formaldehyde.

EXAMPLE 3

A 3000-lb. mixture of 60% hardwood bleached sulfite fibers and 40% softwood bleached sulfite fibers was dispersed in 6900 gallons of water containing 15 lbs. of carboxymethyl cellulose and refined to a double disc refiner slowness of 14 seconds and a Jordan slowness of 42.7 seconds (Williams slowness tester) to provide a high degree of hydration and, consequently, high strength and stiffness. To one portion of the resulting pulp slurry there was added 0.3% of Resin A, 0.6% of Resin B, 0.8% of Resin C, $AlCl_3$ in an amount sufficient to give a pH of 4.6, and 1.75% of sodium stearate sizing agent, and a paper sheet, designated herein as sheet 3–(a), was prepared in the conventional manner. To a second portion of the same pulp slurry there was added 1% of Resin A, $AlCl_3$ in an amount sufficient to give a pH of 4.1, 2% sodium stearate sizing agent, and 0.04% of a cationic high molecular weight polyacrylamide retention aid, and a second paper sheet, designated herein as sheet 3–(b), was made in the same manner as sheet 3–(a). The properties of sheets 3–(a) and 3–(b) are summarized in Table III.

TABLE III

| Property | Sheet 3–(a) | Sheet 3–(b) |
|---|---|---|
| Basis weight (lbs./1,000 ft.²) | 58 | 53 |
| Thickness (mils) | 13.0 | 13.3 |
| Tear strength (Elmendorf), length direction | 170 | 144 |
| Tear strength (Elmendorf), cross direction | 170 | 160 |
| Mullen (p.s.i.) | 95 | 55 |
| Wet tensile strength (hectograms per 15 millimeter width) | >50 | 37 |
| Taber stiffness (dry), length direction | 77 | 14 |
| Taber stiffness (dry), cross direction | 31 | 18 |

As shown by the above data, sheet 3–(a) exhibits superior strength and stiffness properties as compared with sheet 3–(b). Moreover, when both of these sheets were coated with baryta and then with a photographic emulsion the product prepared from sheet 3–(a) was superior to that from sheet 3–(b) with respect to the photographic properties mentioned in Example 1 because of the lower content of formaldehyde.

Similar good results to those obtained with sheet 3–(a) were also obtained when paper sheets were prepared in the same manner as sheet 3–(a) except that the amount of Resin A was increased to 0.5 percent.

EXAMPLE 4

A pulp slurry was prepared by dispersing 3000 lbs. of high alpha softwood bleached sulfite fibers in 6900 gallons of water containing 15 lbs. of carboxymethyl cellulose. After refining was completed, to one portion of this pulp there was added 0.1% of Resin A, 0.5% of Resin B, 0.8% of Resin C, $AlCl_3$ in an amount sufficient to give a pH of 4.8, and 1.6% of sodium stearate sizing agent; to a second portion there was added 0.2% Resin A, 0.5% Resin B, 0.8% Resin C, $AlCl_3$ in an amount sufficient to give a pH of 4.8 and 1.6% sodium stearate sizing agent; and to a third portion there was added 0.5% Resin B, $AlCl_3$ in an amount sufficient to give a pH of 4.8, and 1.5% of cationic starch. Paper sheets were prepared from each of the aforesaid pulp slurries and are designated herein as sheets 4–(a), 4–(b) and 4–(c), respectively. The properties of these sheets are summarized in Table IV.

TABLE IV

| Property | Sheet 4–(a) | Sheet 4–(b) | Sheet 4–(c) |
|---|---|---|---|
| Basis weight (lbs./1,000 ft.²) | 42.0 | 41.75 | 41.75 |
| Thickness (mils) | 8.8 | 8.7 | 8.8 |
| Tear strength (Elmendorf), length direction | 112 | 112 | 112 |
| Tear strength (Elmendorf), cross direction | 124 | 120 | 114 |
| Mullen (p.s.i.) | 74 | 78 | 64 |
| Wet tensile strength (hectograms per 15 millimeter width) | 43 | 44 | 34 |
| Fold (length direction) | 19 | 28 | 15 |
| Fold (cross direction) | 26 | 26 | 25 |

As shown by the above data, sheets 4–(a) and 4–(b) exhibit physical properties at least as good as sheet 4–(c). Moreover, when all three of these sheets were coated with baryta and then with a photographic emulsion the products prepared from sheets 4–(a) and 4–(b) were superior to that prepared from sheet 4–(c) with respect to emulsion hardness, and consequent reduction in lint pick-up and reduction in frilling, because sheets 4–(a) and 4–(b) contained a small amount of formaldehyde while sheet 4–(c) contained no formaldehyde. At the same time, the formaldehyde content of sheets 4–(a) and 4–(b) was sufficiently low that the photographic properties of the emulsion were not adversely affected.

As illustrated by the examples presented herein, photographic paper prepared in accordance with this invention, i.e. paper incorporating the appropriate proportions of a cationic thermosetting amino-aldehyde wet-strength resin, a cationic thermosetting polyamide-epichlorohydrin wet-strength resin, and an anionic polyacrylamide dry-strength resin, is substantially improved over photographic paper made in accordance with prior practice in which a larger proportion of the cationic thermosetting amino-aldehyde wet-strength resin is used as sole wet-strength agent. This improvement is evidenced by both improved physical properties in the paper and better photographic characteristics. On the other hand, photographic paper prepared in accordance with this invention is also substantially improved over photographic paper made in accordance with prior practice in which the paper contains only a cationic thermosetting polyamide-epichorohydrin wet strength resin and is, therefore, free of aldehyde, since it provides for hardening of the emulsion layer and consequent improved resistance to lint pick-up and improved adhesion of the emulsion layer to the base.

The invention has been described in detail with particular reference to preferred embodiments thereof, but it will be understood that variations and modifications can be effected within the spirit and scope of the invention.

I claim:

1. Sensitized photographic paper having good wet strength properties comprising cellulosic paper-making fibers and containing (1) a cationic thermosetting amino-aldehyde wet-strength resin in an amount of from about 0.001 to about 0.006 part per part by weight of said fibers on a dry basis, (2) a cationic thermosetting polyamide-epichlorohydrin wet-strength resin in an amount of from about 0.003 to about 0.01 part per part by weight of said fibers on a dry basis, and (3) an anionic polyacrylamide dry-strength resin in an amount of from about 0.004 to about 0.015 part per part by weight of said fibers on a dry basis and a gelatin silver halide emulsion layer whereby the paper is characterized by its ability to provide gradual release of aldehyde to the emulsion layer to act as a gelatin-hardening agent.

2. Paper as described in claim 1 wherein said amino-aldehyde resin is present in an amount of from about 0.003 to about 0.005 part per part by weight, said polyamide-epichlorohydrin resin is present in an amount of from about 0.005 to about 0.008 part per part by weight, and said polyacrylamide resin is present in an amount of from about 0.007 to about 0.012 part per part by weight.

3. Paper as described in claim 1 wherein said amino-aldehyde resin is an amino-formaldehyde resin.

4. Paper as described in claim 1 wherein said amino-aldehyde resin is a melamine-formaldehyde resin.

5. Paper as described in claim 1 wherein said polyamide-epichlorohydrin resin is prepared from a polyalkylene polyamine, adipic acid and epichlorohydrin.

6. Paper as described in claim 1 wherein said polyamide-epichlorohydrin resin is prepared from diethylenetriamine, adipic acid and epichlorohydrin.

7. Paper as described in claim 1 wherein said polyacrylamide resin is a copolymer of acrylamide and acrylic acid.

8. Paper as described in claim 1 wherein said polyacrylamide resin is a copolymer consisting of about 85 to about 95 percent acrylamide and about 5 to about 15 percent acrylic acid.

9. Paper as described in claim 1 additionally comprising a sizing amount of sodium stearate sizing agent.

10. Paper as described in claim 1 additionally comprising aluminum chloride in an amount sufficient to precipitate the anionic polyacrylamide dry-strength resin on the cellulosic paper-making fibers.

11. Paper as described in claim 1 additionally comprising a wet strengthening amount of carboxymethyl cellulose resin.

12. Sensitized photographic paper having good wet strength properties comprising cellulosic paper-making fibers, a sizing amount of a sizing agent, an amount of aluminum chloride sufficient to precipitate an anionic polyacrylamide dry strength resin on cellulosic paper-making fibers, a cationic thermosetting melamine-formaldehyde wet-strength resin in an amount of from about 0.003 to about 0.005 part per part by weight of said fibers on a dry basis, a cationic thermosetting polyamide-epichlorohydrin wet-strength resin in an amount of from about 0.005 to about 0.008 part per part by weight of said fibers on a dry basis, and an anionic polyacrylamide dry-strength resin in an amount of from about 0.007 to about 0.012 part per part by weight of said fibers on a dry basis and a gelatin silver halide emulsion layer whereby the paper is characterized by its ability to provide gradual release of aldehyde to the emulsion layer to act as a gelatin-hardening agent.

13. Sensitized photographic paper having good wet strength properties comprising cellulosic paper-making fibers, a sizing amount of a sizing agent, an amount of aluminum chloride sufficient to precipitate an anionic polyacrylamide dry strength resin on cellulosic paper-making fibers, a wet strengthening amount of carboxymethyl cellulose resin, a cationic thermosetting melamine-formaldehyde wet-strength resin in an amount of from about 0.003 to about 0.005 part per part by weight of said fibers on a dry basis, a cationic thermosetting polyamide-epichlorohydrin wet-strength resin, prepared from a polyalkylene polyamine, adipic acid and epichlorohydrin, in an amount of from about 0.005 to about 0.008 part per part by weight of said fibers on a dry basis and an anionic polyacrylamide dry-strength resin which is a copolymer consisting of about 85 to about 95 percent acrylamide and about 5 to about 15 percent acrylic acid, in an amount of from about 0.007 to about 0.012 part per part by weight of said fibers on a dry basis and a gelatin silver halide emulsion layer whereby the paper is characterized by its ability to provide gradual release of aldehyde to the emulsion layer to act as a gelatin-hardening agent.

14. In a process for the production of sensitized photographic paper having a gelatin silver halide emulsion layer thereon wherein cellulosic paper-making fibers are dispersed in water to form a slurry, the slurry is sheeted, and the resulting paper sheet is subjected to drying and curing, the improvement comprising incorporating in said slurry prior to sheet formation (1) a cationic thermosetting amino-aldehyde wet-strength resin in an amount of from about 0.001 to about 0.006 part per part by weight of said fibers on a dry basis, (2) a cationic thermosetting polyamide-epichlorohydrin wet-strength resin in an amount of from about 0.003 to about 0.01 part per part by weight of said fibers on a dry basis, and (3) an anionic polyacrylamide dry-strength resin in an amount of from about 0.004 to about 0.015 part per part by weight of said fibers on a dry basis, and sheeting at a pH in the range of from about 4 to about 7.

15. A process as described in claim 14 wherein said amino-aldehyde resin is employed in an amount of from about 0.003 to about 0.005 part per part by weight, said polyamide-epichlorohydrin resin is employed in an amount of from about 0.005 to about 0.008 part per part by weight, and said polyacrylamide resin is employed in an amount of from about 0.007 to about 0.012 part per part by weight.

16. A process as described in claim 15 wherein sheeting is effected at a pH in the range of from about 4.5 to about 5.5.

17. A process as described in claim 16 wherein said amino-aldehyde resin is a melamine-formaldehyde resin.

18. A process as described in claim 17 wherein a sizing amount of sizing agent and aluminum chloride in an amount sufficient to precipitate the anionic polyacrylamide dry strength resin on the cellulosic paper-making fibers are also incorporated in said slurry.

References Cited
UNITED STATES PATENTS

| | | | |
|---|---|---|---|
| 2,559,221 | 7/1951 | Maxwell et al. | 162—166 |
| 2,887,380 | 5/1959 | Driscoll et al. | 96—85 |
| 3,058,873 | 10/1962 | Keim et al. | 162—164 |
| 3,320,066 | 5/1967 | Garth | 96—85 |
| 3,332,834 | 7/1967 | Reynolds | 162—168X |

S. LEON BASHORE, Primary Examiner

U.S. Cl. X.R.

96—85; 162—166, 168, 181A